Patented July 29, 1924.

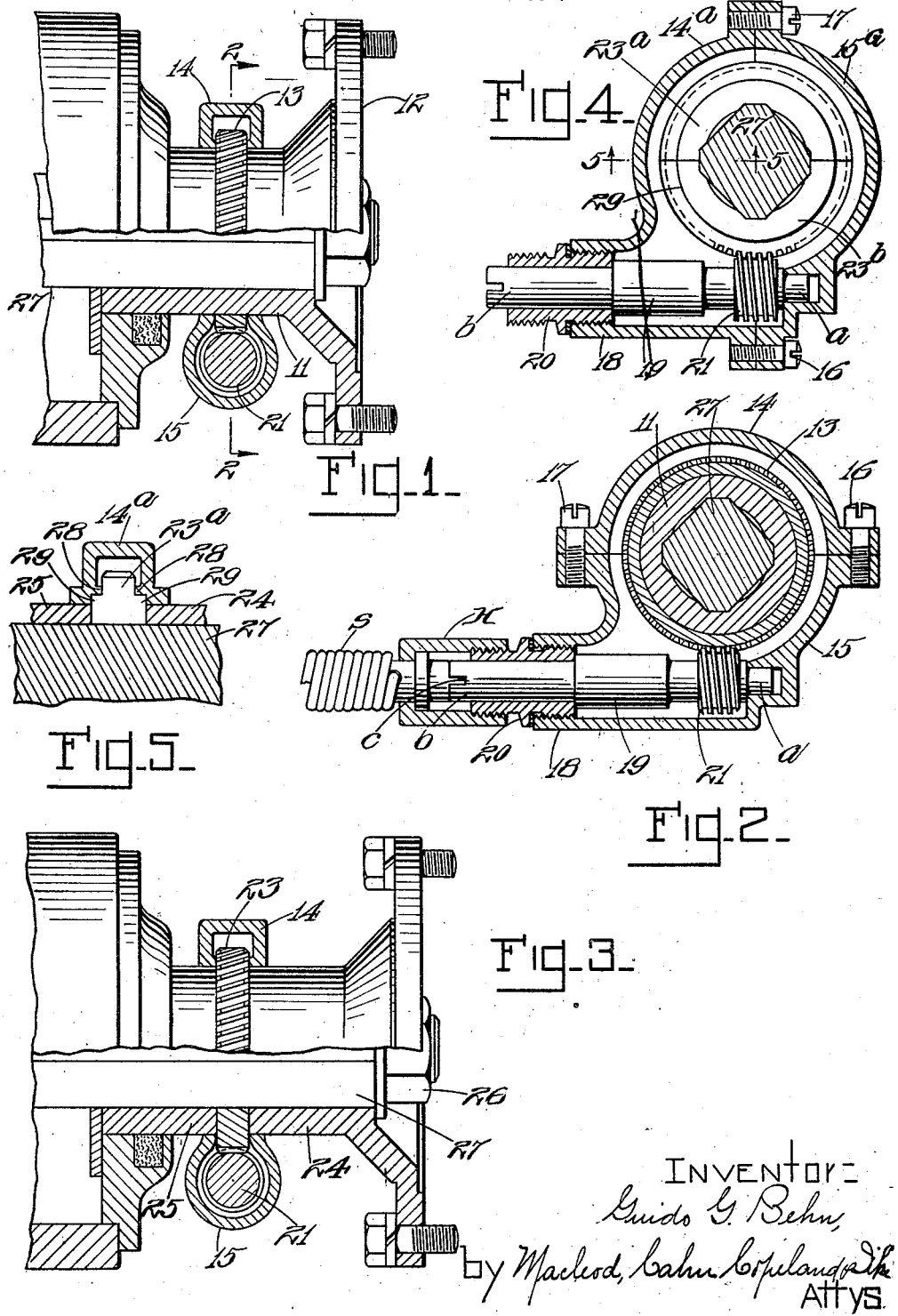

1,502,841

UNITED STATES PATENT OFFICE.

GUIDO G. BEHN, OF DETROIT, MICHIGAN, ASSIGNOR TO ESSEX MOTORS, OF DETROIT, MICHIGAN, A CORPORATION OF MICHIGAN.

SPEEDOMETER DRIVE.

Application filed December 2, 1921. Serial No. 519,561.

*To all whom it may concern:*

Be it known that I, GUIDO G. BEHN, a citizen of the United States, residing at Detroit, county of Wayne, State of Michigan, have invented a certain new and useful Improvement in Speedometer Drives, of which the following is a specification, reference being had therein to the accompanying drawings.

My invention has for its object a new and improved speedometer drive for use on motor vehicles, the particular object of the invention being to provide a drive of this character which shall be cheaper, simpler and more effective than those heretofore constructed and which shall be capable of being changed as required when different gear ratios are employed with the least possible expense for labor. To this end, therefore, I have mounted a ring on a rotatable member of the vehicle such, for instance, as the main propeller shaft, or on a portion of the shaft such, for instance, as the universal joint hub, and have encased the ring gear in a floating housing carrying the pinion and the end of the flexible shaft, the whole being constructed so that the housing is free to rotate except as restrained by the flexible shaft, and the pinion, and preferably also the gear, being readily removable and replaceable when it is desired to change the gear ratios.

The invention will be fully understood from the following description when taken in connection with the accompanying drawings, and the novel features thereof will be pointed out and clearly defined in the claims at the close of this specification.

In the drawings, Fig. 1 is a longitudinal view partly in section of a portion of a universal joint to which is applied the speedometer drive embodying my invention.

Fig. 2 is a section on line 2, 2 of Figure 1.

Fig. 3 is a view similar to Figure 1 showing another way of securing the ring gear in place.

Fig. 4 is a view similar to Fig. 2 showing a further modification.

Fig. 5 is a section taken substantially on the line 5, 5 of Figure 4.

Referring to Figures 1 and 2, at 11 is shown the hub of the universal joint flange 12, said hub being suitably secured to the end of the usual power-transmitting shaft 27 for rotation therewith. To this hub 11 is secured a ring gear 13. Surrounding the gear is a casing composed of two parts 14 and 15 secured together by studs 16 and 17. This casing includes on the lower side a projection 18 extending transversely of the axis of the universal joint and having therein an opening to receive a spindle 19 the outer end of which, *a*, is in a bearing in the inside of the housing, and the inner end of which, *b*, passes through a bushing 20 which is screwed into the opening. The bushing also serves to hold the spindle in place. On the spindle 19 is a pinion 21 which meshes with the ring gear 13. The end of the spindle is notched, as shown at *c*, to receive the end of the usual flexible shaft S leading to the speedometer head, the adjacent end of said shaft being journalled in a housing H detachably secured to the outer end of the bushing 20. The housing is freely rotatable on the universal joint hub, but is restrained from rotation by the flexible shaft.

When the gear ratio of the vehicle is changed and it is necessary to make a corresponding change in the speedometer, it is only necessary to remove the housing H and bushing 20, after which the spindle 19 and pinion 21 may be withdrawn through the opening in the end of the casing projection 18 and replaced by another spindle and pinion which will give the desired ratio of movement. As is well known, it is possible to obtain certain combinations without changing the ring gear.

Referring now to Figure 3, there is there shown a speedometer drive which is the same as that already described, except that the ring gear 23 is not secured to the outside of the hub itself, but the hub 24 is made shorter and a spacing ring 25 is employed, the ring gear 23 being placed between the proximate faces of the end of the hub and of the spacing ring, and the parts firmly secured together by the nut 26. The gear 23 is seated upon and suitably connected with the shaft 27 for rotation therewith, as by making the end of said shaft of non-circular cross-section and providing said gear with a non-circular opening to receive said shaft end.

In the forms of the invention shown in Figures 1 to 3 the casing 14, 15 is divided on a plane passing through the axis of the shaft 27 substantially parallel to the axis of the spindle 19. As shown in Figure 4, the casing 14ª, 15ª is divided on a plane also passing through the axis of the shaft 27 but transverse or substantially perpendicular to the axis of the spindle 19, the bearings for the inner and outer ends of said spindle being formed in the casing parts 14ª and 15ª, respectively. With this construction it will be seen that separation of the casing parts and removal of the part 15ª will permit the spindle 19 to be withdrawn outwardly without removing the bushing 20 or housing H, thereby avoiding the necessity of drawing the pinion 21 through the threaded opening in the end of the casing extension 18. It will be obvious that with this construction the bushing 20 might be omitted and the end of the casing extension 18 itself suitably formed to provide a bearing for the inner end of the spindle 19 and to retain the same in place, as well as to provide means for attachment of the housing H.

In the construction shown in Figures 4 and 5, moreover, the ring gear, which is seated upon the shaft 27 between the hub 24 and spacing ring 25, as in Figure 3, is divided transversely of the shaft into two similar sections or halves 23ª and 23ᵇ which are retained in assembled position upon said shaft by the casing parts 14ª and 15ª when the latter are secured in place, said casing parts being formed with interior annular shoulders 28 which engage annular ribs or projections 29 formed on said gear sections. With this construction the ring or main drive gear, as well as its co-operating pinion, may be changed for the purpose of varying the gear ratio merely by removing the casing and without disassembling any of the other parts.

What I claim is—

1. A speedometer drive comprising a vehicle shaft, a sectional gear on said shaft, a removable casing enclosing said gear, means in said casing and on said gear for retaining the sections of said gear in an assembled position on said shaft when said casing is in place and a pinion meshing with said gear and supported within said casing.

2. A speedometer drive comprising a vehicle shaft, a sectional gear on said shaft, a two-part casing enclosing said gear, members on said gear engaged by a portion of said casing for retaining the sections of said gear in assembled position on said shaft when said gear is in place, and a pinion meshing with said gear and supported within said casing.

3. A speedometer drive comprising a vehicle shaft, a sectional gear on said shaft, a two-part casing enclosing said gear, the parts of said casing having interior annular shoulders, and the sections of said gear having annular ribs engaged by said shoulders to retain said gear sections in assembled position on said shaft when said casing is in place, and a pinion meshing with said gear and supported within said casing.

4. A speedometer drive comprising a vehicle shaft, a sectional power transmitting gear on said shaft, a sectional casing enclosing said gear, said gear and casing having interengaging annular surfaces whereby said power transmitting element is held in assembled position on said shaft when said casing is in place, and a cooperating power transmitting element supported within said casing.

5. The combination with the driving shaft of a motor vehicle and the universal joint hub secured thereto, of a speedometer drive comprising a sectional gear on said shaft, a sectional casing rotatable on said hub and enclosing said gear, said casing engaging said gear and holding the same in assembled position on said shaft when said casing is in place, a power transmitting shaft connected with said casing, and a pinion in said casing connected with said power transmitting shaft and meshing with said gear.

In testimony whereof I affix my signature.

GUIDO G. BEHN.